United States Patent
Aaron et al.

(10) Patent No.: US 7,644,128 B2
(45) Date of Patent: Jan. 5, 2010

(54) METHODS, SYSTEMS, AND COMPUTER PROGRAM PRODUCTS FOR OPERATING AN ELECTRONIC MAIL OR MESSAGING SYSTEM IN WHICH INFORMATION ASSOCIATED WITH AN ATTACHMENT IS SENT TO A DESTINATION FOR EVALUATION BEFORE SENDING THE ATTACHMENT

(75) Inventors: Jeffrey A. Aaron, Atlanta, GA (US); Jun-Gang Alin, Duluth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 713 days.

(21) Appl. No.: 11/250,919

(22) Filed: Oct. 14, 2005

(65) Prior Publication Data

US 2007/0115980 A1 May 24, 2007

(51) Int. Cl.
 *G06F 15/16* (2006.01)
(52) U.S. Cl. .................................................. 709/206
(58) Field of Classification Search .................. 709/206
 See application file for complete search history.

(56) References Cited

U.S. PATENT DOCUMENTS

| | | | |
|---|---|---|---|
| 5,614,940 A * | 3/1997 | Cobbley et al. | 725/138 |
| 6,012,039 A * | 1/2000 | Hoffman et al. | 705/14 |
| 6,044,260 A * | 3/2000 | Eaton et al. | 455/406 |
| 6,185,584 B1 * | 2/2001 | Paik et al. | 715/201 |
| 6,438,548 B1 * | 8/2002 | Grim et al. | 707/8 |
| 6,581,097 B1 * | 6/2003 | Lynch et al. | 709/226 |
| 7,200,865 B1 * | 4/2007 | Roscoe et al. | 726/12 |
| 7,395,315 B2 * | 7/2008 | Colson et al. | 709/206 |
| 2001/0048728 A1 * | 12/2001 | Peng | 375/354 |
| 2002/0065892 A1 * | 5/2002 | Malik | 709/206 |
| 2003/0115273 A1 * | 6/2003 | Delia et al. | 709/206 |
| 2004/0010543 A1 * | 1/2004 | Grobman | 709/203 |
| 2004/0225689 A1 * | 11/2004 | Dettinger et al. | 707/200 |
| 2005/0108336 A1 * | 5/2005 | Naick et al. | 709/206 |
| 2005/0193236 A1 * | 9/2005 | Stager et al. | 714/6 |
| 2006/0184797 A1 * | 8/2006 | Weis et al. | 713/178 |
| 2006/0288053 A1 * | 12/2006 | Holt et al. | 707/203 |

FOREIGN PATENT DOCUMENTS

EP 1016986 A2 * 7/2000

OTHER PUBLICATIONS

U.S. Appl. No. 10/928,338 entitled *Methods, Systems and Computer Program Products for Monitoring Service Usage*, filed Aug. 27, 2004.

* cited by examiner

*Primary Examiner*—Kenny S Lin
*Assistant Examiner*—Julian Chang
(74) *Attorney, Agent, or Firm*—Myers Bigel Sibley & Sajovec, P.A.

(57) ABSTRACT

An electronic mail/messaging system is operated by compiling information associated with an attachment for an electronic mail at a source. The information includes initial information and descriptive information. The initial information is sent to a destination. A determination is made whether the destination has a file that matches the attachment based on the initial information. The attachment is sent to the destination if the destination does not have the file. The descriptive information is sent to the destination if the destination has the file. A determination is made whether the file matches the attachment based on the descriptive information. The attachment is sent to the destination if the file does not match the attachment based on the descriptive information.

20 Claims, 3 Drawing Sheets

METHODS, SYSTEMS, AND COMPUTER PROGRAM PRODUCTS FOR OPERATING AN ELECTRONIC MAIL OR MESSAGING SYSTEM IN WHICH INFORMATION ASSOCIATED WITH AN ATTACHMENT IS SENT TO A DESTINATION FOR EVALUATION BEFORE SENDING THE ATTACHMENT

FIELD OF THE INVENTION

The present invention relates to electronic mail/messaging systems and methods of operating the same, and, more particularly, to methods, systems, and computer program products for communicating attachments in an electronic mail system.

BACKGROUND OF THE INVENTION

Electronic messaging and file sharing, including the use of email/messaging, has generally become commonplace and central to both private life and business conduct. Data files/attachments are increasingly transmitted along with electronic messages to the point that users make use of their email or other messaging applications to store attachments, such as documents, pictures, etc., so that these files can be identified and placed into context via the associated electronic message. Attachments may also be sent along with meeting invitations and subsequent updates, for example, as part of a calendaring/reservation system. Unfortunately, an attachment may often be sent without regard to recipients that may already have received the attachment. In many cases, recipients may receive the same attachment from multiple senders. This may result in many identical versions of an attachment being transmitted to the same recipient, which may waste network/communications resources. Moreover, many similar and largely redundant versions of an attachment may also be stored, which may waste storage resources. Due to the numerous versions, a user may have difficulty in determining which version of an attachment to use and which to delete. Moreover, it may be difficult for both senders and receivers of attachments to know, for example, when a particular attachment should/should not be sent, whether a particular attachment is the latest version, and/or when or if a particular attachment should be deleted or retained. This lack of coordination, lack of knowledge, and/or lack of management may result in considerable inefficiency, loss of user time, loss of communications capacity, and/or loss of electronic storage capacity.

SUMMARY OF THE INVENTION

According to some embodiments of the present invention, an electronic mail system is operated by compiling information associated with an attachment for an electronic mail at a source. The information includes initial information and descriptive information. The initial information is sent to a destination. A determination is made whether the destination has a file that matches the attachment based on the initial information. The attachment is sent to the destination if the destination does not have the file. The descriptive information is sent to the destination if the destination has the file. A determination is made whether the file matches the attachment based on the descriptive information. The attachment is sent to the destination if the file does not match the attachment based on the descriptive information.

In other embodiments of the present invention, the attachment is received at the destination and the file is deleted responsive to receiving the attachment if the attachment is more current than the file. The file is sent to the source if the file is more current than the attachment.

In still other embodiments of the present invention, deleting the file comprises deleting the file responsive to receiving the attachment if the attachment is more current than the file and deletion of the file has been authorized. If the attachment is more current than the file but deletion has not been authorized, then the file may be replaced by the attachment while the file is first saved as a backup, and, optionally, the user may be notified of the replacement in case the user wishes to compare the two. Alternately or additionally, if the attachment is more current than the file but deletion has not been authorized, then the file may be replaced by the attachment while the file is first saved as a backup, but prior to the backup and replacement the user may be allowed to confirm or reject the backup and replacement in accordance with the user's pre-selected preferences. The attachment is saved at the destination if the attachment is more current than the file or the destination does not have the file based on the initial information, and if saving the attachment has been authorized.

In still other embodiments of the present invention, an alert and/or an alarm is invoked at the source and/or destination if a number of times that the file is sent to the source because it is more current than the attachment per a unit of time exceeds a threshold. An alert and/or an alarm is invoked at the destination if it cannot be determined which is more current between the file and the attachment.

In still other embodiments of the present invention, a no match message is sent from the destination to the source if the destination does not have the file based on the initial information.

In still other embodiments of the present invention, an inexact match message is sent from the destination to the source if the destination has the file based on the initial information.

In still other embodiments of the present invention, the initial information comprises a file descriptor and/or a size.

In still other embodiments of the present invention, the descriptive information comprises a checksum, an owner, a creator, a creation date, a modification history, a transmission history, a transmission acknowledgement, and/or a processing notification.

In still other embodiments of the present invention, an alert and/or an alarm is invoked at the destination if transmissions from the source and/or additional sources per a first unit of time exceed a first threshold, if a number of times that the attachment is received per a second unit of time exceeds a second threshold, and/or if a number of times that the attachment is received per a third unit of time exceeds a third threshold and the file is more current than the attachment.

In still other embodiments of the present invention, an alert and/or an alarm is invoked at the source if a number of times that the attachment is not sent to the destination per a unit of time exceeds a threshold.

In still other embodiments of the present invention, events associated with sending the attachment from the source to the destination and determining if the file matches the attachment are logged.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

Figure 1:
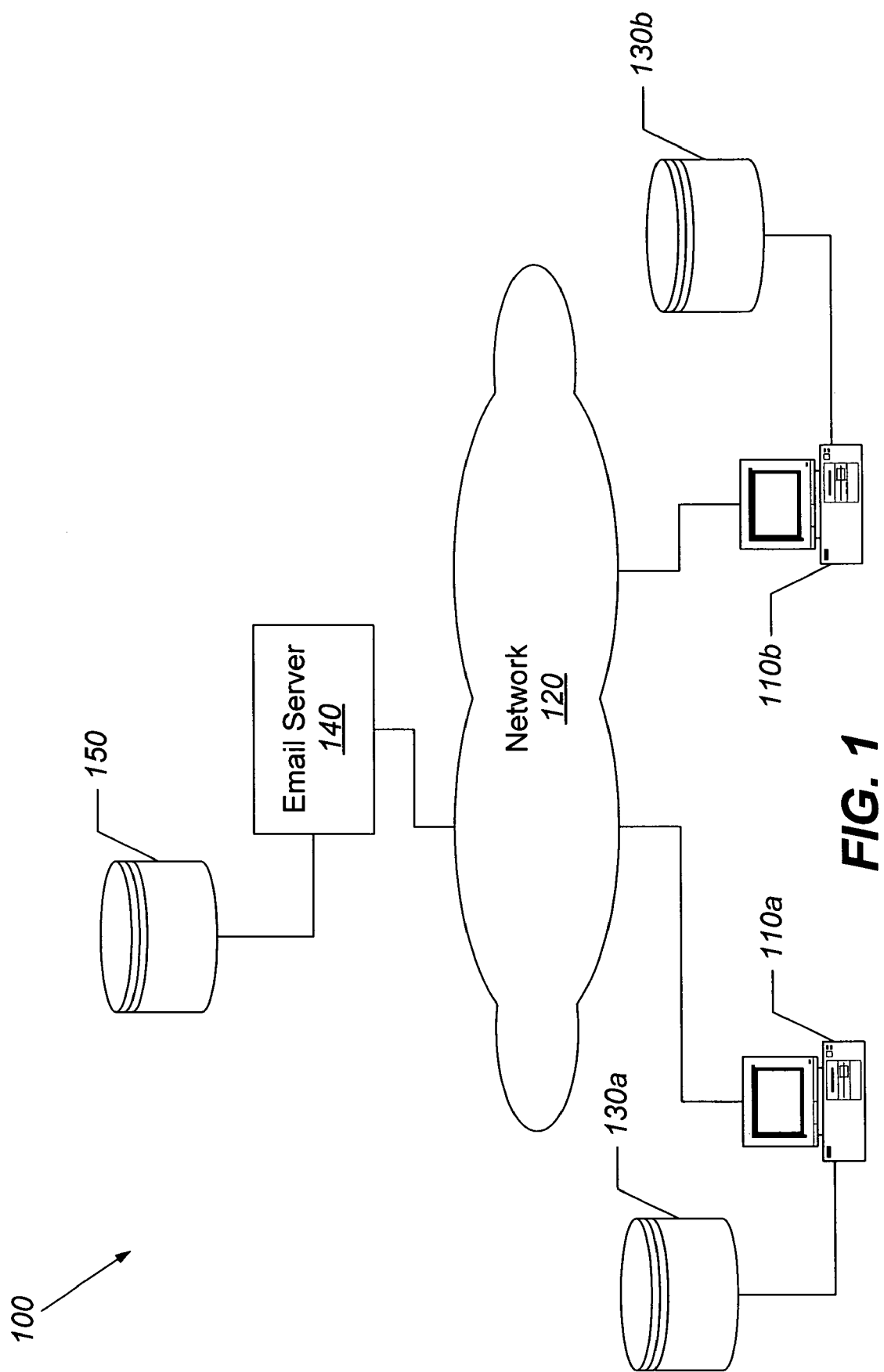
FIG. 1 is a block diagram that illustrates a communication network that includes an electronic mail system in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Moreover, the intervening elements, in some cases, may comprise one or more communications networks, for example. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, electronic mail (email) means a text message, a set or collection of data, and/or computer file that can be exchanged between computers and/or terminals over a communication network, such as a local area network and/or the Internet, where the communication network or networks may be wireline and/or wireless. Note that embodiments of the invention may be applicable to any electronic communication where attachments may be used, such as, but not limited to, email/messaging, Instant Messaging (IM), voice calls (VoIP), Voice over Internet Protocol), video calls, and/or peer-to-peer (P2P) file transfers, etc. Also, as used herein, attachment means any definable file or data associated or associable with a communication. The attachment may be "inside" the communication, meaning the attachment is actually included in the main message, or "external," meaning the attachment is associated to the communication in some manner, but is not inherently part of the communication. Also, although client-server architecture is used herein to illustrate some embodiments of the invention, other embodiments of the invention may use peer-to-peer (P2P) or other architectural models. For example, with P2P approaches, the "client" may sometimes act as a client and other times may act as a server, and/or or may simultaneously act as both a client and a server.

Referring now to FIG. 1, an exemplary network architecture 100 that includes an email/messaging system, in accordance with some embodiments of the present invention, comprises computers/terminals 110a and 110b that can communicate with each other via a network 120 as shown. The computers/terminals 110a and 110b may each be configured with sufficient memory to run an email/messaging application in which information associated with an email/messaging attachment is sent to a destination for evaluation before sending the attachment in accordance with some embodiments of the present invention. Moreover, the computers/terminals 110a and 110b may optionally communicate with storage devices 130a and 130b, respectively, which may be used by the email/messaging applications to store emails, email attachments, files, data, or the like. An email/messaging server 140 along with a storage device 150 may optionally be connected to the network 120 and may be used by the computers/terminals 110a and/or 110b to process email/messages in a client-server environment. Moreover, the email/messaging server 140 may include logging software that logs various events and operations of the email/messaging system that may be used for debugging and/or evaluation purposes, for example. That is, the computers/terminals 110*a* and/or 110*b* may communicate with the email/messaging server 140 in a client-server configuration or environment.

As shown in FIG. 1, a client 110*a,b* may communicate with a server 140 over a wireless and/or wireline communication medium 120. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. Some clients can be used to request web services programmatically by a program in lieu of a web browser. The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

The clients and servers can communicate using a standard communications mode, such as Hypertext Transport Protocol (HTTP). According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Examples of email clients include, but are not limited to, Microsoft Outlook and Outlook Express, Mozilla Thunderbird, and Apple iMail. Email protocols include, but are not limited to, POP3 (Post Office Protocol version 3) and IMAP (Internet Message Access Protocol). Examples of IM (Instant Messaging) clients include, but are not limited to, IM clients from Microsoft (MSN, Microsoft Network), Yahoo, and AOL (America OnLine). VoIP (Voice over IP/Internet Protocol) clients may include clients from Skype and Vonage, which typically use SIP (Session Initiation Protocol) to communicate. Also, P2P (Peer-to-Peer) "clients" may include popular software applications such as Napster and BitTorrent, but note that a P2P "client" can actually act as both a client and a server.

Although FIG. 1 illustrates an exemplary communication network, it will be understood that the present invention is not limited to such configurations, but is intended to encompass any configuration capable of carrying out the operations described herein.

Figure 2:
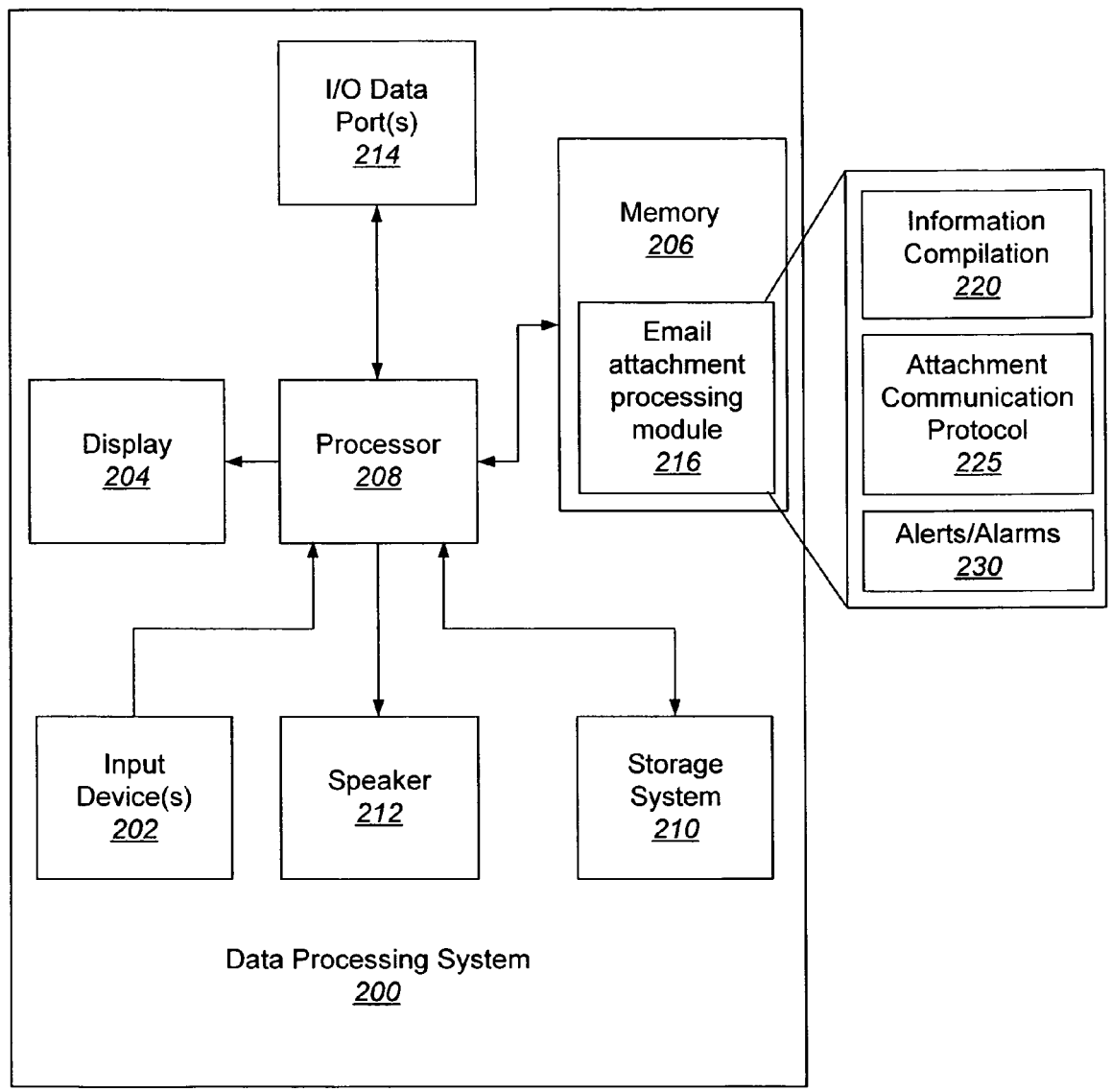
FIG. 2 illustrates a data processing system that may be used to implement various elements of the communication network and electronic mail system of FIG. 1 in accordance with some embodiments of the present invention.

Referring now to FIG. 2, a data processing system 200 that may be used to implement the computers/terminals 110*a,b* and/or the email/messaging server 140 of FIG. 1, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components such as those used in many conventional computing devices, which may be configured to operate as described herein.

The memory 206 may include an email/messaging attachment processing module 216 that is configured to process email/messages in which information associated with an email/messaging attachment is sent to a destination for evaluation before sending the attachment in accordance with some embodiments of the present invention. In some embodiments, the email/messaging attachment-processing module may include an information compilation processing module 220, an attachment communication protocol module 225, and/or an alerts/alarms module 230. The information compilation module 220 may be configured to compile information about an attachment that may be sent with an email/message. In accordance with various embodiments of the present invention, the information may be organized into multiple categories. For example, initial information may include, but is not limited to, a title/descriptor for the attachment along with the size of the attachment. Detailed descriptive information may include, but is not limited to, local information, such as a checksum, owner, creator, creation date, modification history, and/or transmission history. Other detailed descriptive information may include, but is not limited to, remote information, such as transmission acknowledgements, forwarding/update/deletion/modification notifications and other local information obtained from a remote client. The foregoing types of information may be generated when files are created, modified, and/or received.

The attachment communication protocol module 225 may be configured to supervise the management and evaluation of email/messaging attachments between source and destination entities. According to some embodiments of the present invention, the attachment communication protocol module 225 may supervise the sending of an email/messaging attachment to a destination for evaluation before sending the attachment. The attachment communication protocol module 225 may also manage the process of updating and/or deleting a file at a destination based on receipt of an email/messaging attachment.

The alerts/alarms module 230 may be configured to notify a user, via an alert, for example, if a file has been updated, i.e., replaced or substituted with a newer version, and/or deleted when an email/messaging attachment has been received. A user may also be notified via an alert/alarm, for example, if suspicious patterns are detected in the management of email/messaging attachments by either the source and/or the destination.

The functionality of the data processing system 200 of FIG. 2 may be implemented as a single processor system, a multi-processor system, or even a network of stand-alone computer systems, in accordance with various embodiments of the present invention.

Computer program code for carrying out operations of data processing systems discussed above with respect to FIG. 2 may be written in a high-level programming language, such as C or C++, for development convenience. In addition, computer program code for carrying out operations of embodiments of the present invention may also be written in other programming languages, such as, but not limited to, interpreted languages, such as JAVA. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer-program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Exemplary operations for operating an email/messaging system in which information associated with an attachment is sent to a destination for evaluation before sending the attachment will now be described with reference to FIG. 3. Operations begin at block 300 where the information compilation module 220 compiles information associated with an attachment. As discussed above, the information may comprise initial information and detailed descriptive information.

At block 305, the initial information is sent from the source to a destination under the supervision of the attachment communication protocol module 225. A determination is made at the destination whether a file matches the attachment based on the initial information, e.g., a comparison of the title/descriptor and/or size of the attachment is made with that of files at the destination (block 310). If it is determined that the destination has a file that matches the attachment, then the destination may send an inexact match message back to the source, for example when the initial information suggests a likely match, but is insufficient to verify the possible match with a high degree of certainty. The source may then at block 315 send detailed descriptive information back to the destination for evaluation. A determination is made at block 320 whether the file that was an inexact match is an exact match based on the descriptive information. If the file that was an inexact match is determined to be an exact match, then the source need not send the attachment as part of an email/message. Moreover, in some embodiments of the present invention, the destination may determine that the file is more current than the attachment. In this case, the destination may send the file to the source so that the source may replace the attachment locally with the more current file.

Returning to block 310, if it is determined that the destination does not have a matching file based on the initial information, then the destination may, in some embodiments, send a no match message to the source and the source may then send the attachment to the destination at block 325 where it is saved. In some embodiments, the attachment may only be saved at the destination if saving of the attachment has been authorized. Similarly, if it is determined at block 320 that the destination does not have a file that is an exact match of the attachment, then the source may send the attachment to the destination at block 325. In some embodiments of the present invention, a file that is an inexact match of a received attachment, but is not an exact match, may be deleted at the destination if the attachment is more current than the file and, optionally, if deleting the file has been authorized. Moreover, in some embodiments of the present invention, if a received attachment and a file are an inexact match, then the attachment may be saved at the destination if the attachment is more current than the file and, optionally, if saving the attachment has been authorized.

In some embodiments, a more current attachment that is an inexact match may be substituted for the file, and the file is saved as a backup, rather than having the file deleted, so that the user may retrieve the backed up file for comparison and/or retrieval if desired. The backed up file may be saved indefinitely, or for a pre-configured period of time, such as a day, a week, or a month, after which it is deleted. Optionally, the user could be notified of the back up, and optionally the user could be notified of the upcoming deletion close to the end of the back up time period. Further, different kinds of files may be backed up for different time periods pending deletion, or saved indefinitely, to appropriately treat the differences in importance of different file types. Alternately or additionally, if the attachment is more current than the file but deletion has not been authorized, then the file may be replaced by the attachment while the file is first saved as a backup, but prior to the backup and replacement the user may be allowed to confirm or reject the backup and replacement in accordance with the user's pre-selected preferences.

Some embodiments of the present invention may provide additional safeguards and security beyond that used in conventional email/messaging systems via the alerts/alarms module 230. For example, an alert and/or an alarm may be invoked at the source and/or destination if a number of times that a file is sent to the source because it is more current than the attachment per a unit of time exceeds a threshold. In other embodiments, an alert and/or an alarm may be invoked at the destination if it cannot be determined which is more current between a file at the destination and the attachment.

In other embodiments of the present invention, an alert and/or an alarm may be invoked at the destination if transmissions from the source and/or additional sources per a first unit of time exceed a first threshold, if a number of times that an attachment is received per a second unit of time exceeds a second threshold, and/or if a number of times that an attachment is received per a third unit of time exceeds a third threshold and a file at the destination is more current than the attachment.

In still other embodiments, an alert and/or an alarm may be invoked at the source if a number of times that an attachment is not sent to a destination per a unit of time exceeds a threshold.

To facilitate debugging procedures in the email/messaging system, the source and/or the destination may log events associated with sending an attachment from a source to a destination and determining if the destination has a file that matches the attachment.

Figure 3:
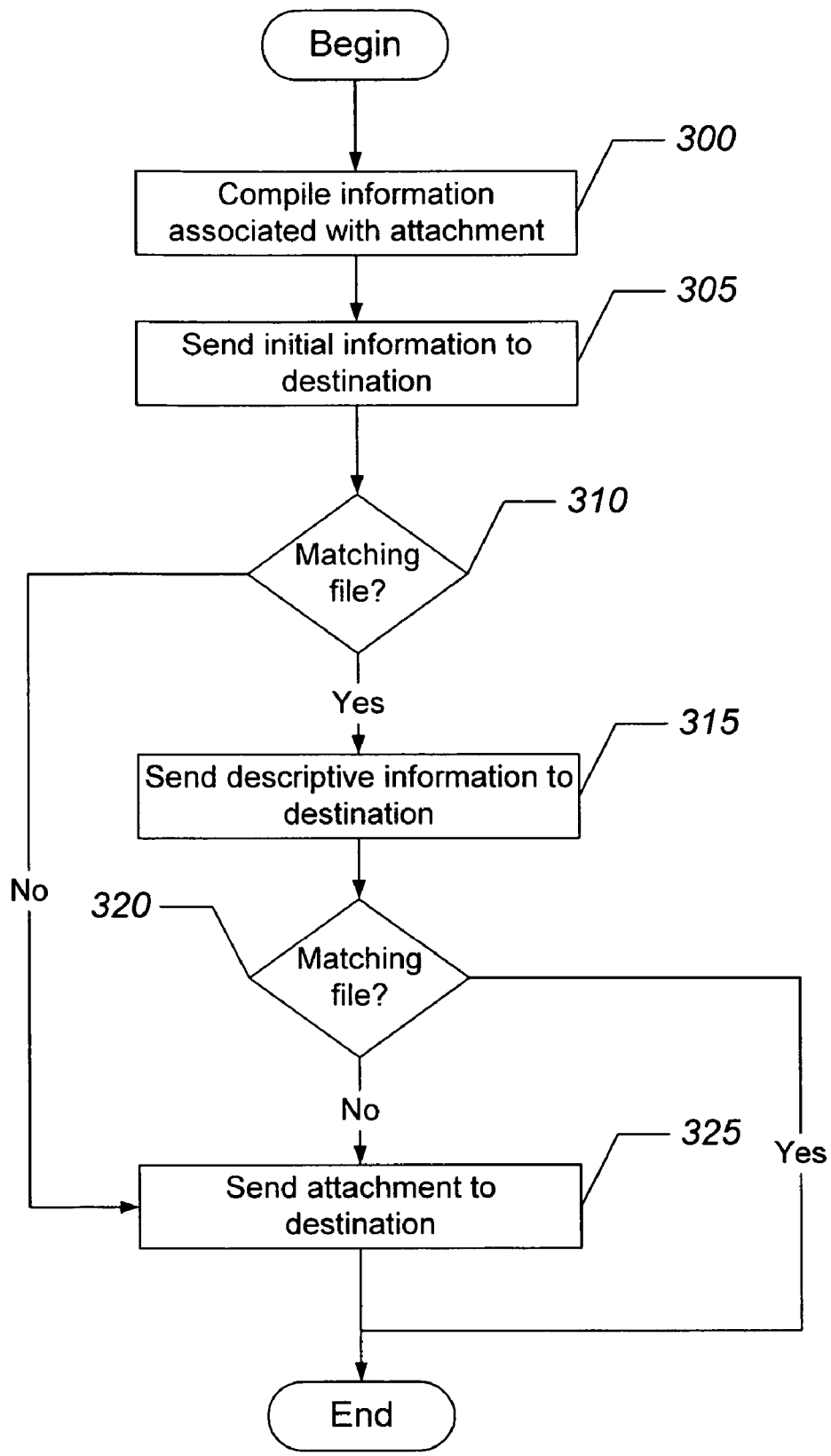
FIG. 3 is a flowchart that illustrates operations for operating an email/messaging system in which information associated with an attachment is sent to a destination for evaluation before sending the attachment in accordance with some embodiments of the present invention.

The flowchart of FIG. 3 illustrates the architecture, functionality, and operations of some embodiments of methods, systems, and computer program products for operating an electronic mail system in which information associated with an attachment is sent to a destination for evaluation before sending the attachment. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Some embodiments of the present invention may be illustrated by way of example. Maria and Sofia work in a company that has subscribed to an automatic email/messaging attachment management service, in accordance with some embodiments of the present invention, which is offered by a provider. Desktop computer software has been installed to enable the service functionality. Both Maria and Sofia work on a common accounting project, which has over thirty people involved, but they are in different groups within the company. Because they both work on one particular aspect of the project, they communicate almost daily whereas the entire team only meets quarterly. Maria gets an email/message with the latest project spreadsheet from her supervisor. She notices some numbers have changed, which she does not think Sofia is yet aware of based on a telephone conversation they had earlier that day. She forwards the spreadsheet as an attachment to an email/message she sends to Sofia. Sofia's software client receives notification of an intent to forward the spreadsheet along with initial descriptive information from Maria's software client. Sofia's client detects a similar document and indicates an inexact match to Maria's client. Maria's client therefore sends detailed information to Sofia's client, which is then able to determine that the match is actually exact in that Sofia has received this exact attachment from her own supervisor just a few minutes previously. Sofia's client notifies Maria's client of the exact match causing Maria's client to refrain from sending the current project spreadsheet. Maria's client sends a record to the provider's central logging server.

Sofia meanwhile has received three separate emails/messages from various members of her group regarding other projects that seem indirectly relevant to the project she is working on with Maria. Thinking these might be of interest to Maria and perhaps might be helpful in their shared work, she forwards all three to Maria. Maria's client receives the three intents to forward along with initial information regarding these three spreadsheets from Sophia's client and determines no match for one and inexact matches for the other two. Her client notifies Sophia's client, which transmits the first no match spreadsheet to Maria's client, and sends Maria's client detailed descriptive information on the other two. Maria's client then determines that it already has a non-current version of one of those files and has a more recent version of the other. It so notifies Sophia's client that the latter spreadsheet is no longer current, i.e., there is a more recent version, and that it has no match for the former. Sophia's client thus transmits the former spreadsheet to Maria's client and alerts Sophia that the former spreadsheet she attempted to send Maria is actually somewhat out of date. Both clients send appropriate log records to a central logging server. Sophia sees an alert pop-up and emails/messages Maria asking for the latest version of the latter spreadsheet, which Maria sends Sophia, who then forwards it to her group.

Advantageously, some embodiments of the present invention may reduce the communication bandwidth in an email/messaging system as some attachments, which otherwise would have been sent, are not sent and reduces the processing resources required at both the source and destination in encrypting and decrypting emails/messages. Storage requirements may also be reduced as fewer duplicative attachments may be saved. Users may benefit in that there may be fewer versions of a document that need to be managed and the likelihood that a document is current may be increased. User control may also be maintained as authorization may be required before an attachment is saved and/or deleted. Some embodiments of the present invention may also improve security in email/messaging systems as suspicious patterns in sending and/or receiving attachments may be detected and an alarm sounded.

Many variations and modifications can be made to the embodiments described herein without substantially departing from the principles of the present invention. All such variations and modifications are intended to be included herein within the scope of the present invention, as set forth in the following claims.

That which is claimed:

1. A method of operating an electronic mail (email)/messaging system, comprising:
    compiling information associated with an attachment for an electronic mail at a source, the information comprising initial information and descriptive information;
    sending the initial information to a destination;
    determining if the destination has a file that matches the attachment based on the initial information;
    sending the attachment to the destination if the destination does not have the file;
    sending the descriptive information to the destination if the destination has the file;
    determining if the file matches the attachment based on the descriptive information; and
    sending the attachment to the destination if the file does not match the attachment based on the descriptive information.

2. The method of claim 1, further comprising:
    receiving the attachment at the destination;
    deleting the file responsive to receiving the attachment if the attachment is more current than the file; and
    sending the file to the source if the file is more current than the attachment.

3. The method of claim 2, wherein deleting the file comprises deleting the file responsive to receiving the attachment if the attachment is more current than the file and deletion of the file has been authorized, the method further comprising:
    saving the attachment at the destination if the attachment is more current than the file or the destination does not have the file based on the initial information, and if saving the attachment has been authorized.

4. The method of claim 2, further comprising:
   invoking an alert and/or an alarm at the source and/or destination if a number of times that the file is sent to the source because it is more current than the attachment per a unit of time exceeds a threshold; and
   invoking an alert and/or an alarm at the destination if it cannot be determined which is more current between the file and the attachment.

5. The method of claim 1, further comprising:
   receiving the attachment at the destination; and
   saving the file as a backup responsive to receiving the attachment if the attachment is more current than the file.

6. The method of claim 5, further comprising:
   deleting the file as the backup upon a lapse of a pre-configured time period.

7. The method of claim 1, further comprising:
   sending a no match message from the destination to the source if the destination does not have the file based on the initial information.

8. The method of claim 1, further comprising:
   sending an inexact match message from the destination to the source if the destination has the file based on the initial information.

9. The method of claim 1, wherein the initial information comprises a file descriptor and/or a size.

10. The method of claim 1, wherein the descriptive information comprises a checksum, an owner, a creator, a creation date, a modification history, a transmission history, a transmission acknowledgement, and/or a processing notification.

11. The method of claim 1, further comprising:
    invoking an alert and/or an alarm at the destination if transmissions from the source and/or additional sources per a first unit of time exceed a first threshold, if a number of times that the attachment is received per a second unit of time exceeds a second threshold, and/or if a number of times that the attachment is received per a third unit of time exceeds a third threshold and the file is more current than the attachment.

12. The method of claim 1, further comprising:
    invoking an alert and/or an alarm at the source if a number of times that the attachment is not sent to the destination per a unit of time exceeds a threshold.

13. The method of claim 1, further comprising:
    logging events associated with sending the attachment from the source to the destination and determining if the file matches the attachment.

14. An electronic mail (email)/messaging system, comprising:
    a source system; and
    a destination system:
    wherein the source system is configured to compile information associated with an attachment for an electronic mail, the information comprising initial information and descriptive information, to send the initial information to the destination system, to send the attachment to the destination system if the destination system does not have a file that matches the attachment based on the initial information, to send the descriptive information to the destination if the destination system has the file, and to send the attachment to the destination system if the file does not match the attachment based on the descriptive information; and
    wherein the destination system is configured to determine if the file matches the attachment based on the initial information, and to determine if the file matches the attachment based on the descriptive information.

15. The system of claim 14, wherein the initial information comprises a file descriptor and/or a size and wherein the descriptive information comprises a checksum, an owner, a creator, a creation date, a modification history, a transmission history, a transmission acknowledgement, and/or a processing notification.

16. The system of claim 14,
    wherein the destination system is further configured to invoke an alert and/or an alarm if transmissions from the source and/or additional sources per a first unit of time exceed a first threshold, if a number of times that the attachment is received per a second unit of time exceeds a second threshold, and/or if a number of times that the attachment is received per a third unit of time exceeds a third threshold and the file is more current than the attachment.

17. The system of claim 14,
    wherein the source system and/or the destination system is further configured to log events associated with sending the attachment from the source to the destination and determining if the file matches the attachment.

18. A computer program product for operating an electronic mail (email)/messaging system, comprising:
    a computer readable storage medium having computer readable program code embodied therein, the computer readable program code comprising:
    computer readable program code configured to compile information associated with an attachment for an electronic mail at a source, the information comprising initial information and descriptive information;
    computer readable program code configured to send the initial information to a destination;
    computer readable program code configured to determine if the destination has a file that matches the attachment based on the initial information;
    computer readable program code configured to send the attachment to the destination if the destination does not have the file;
    computer readable program code configured to send the descriptive information to the destination if the destination has the file;
    computer readable program code configured to determine if the file matches the attachment based on the descriptive information; and
    computer readable program code configured to send the attachment to the destination if the file does not match the attachment based on the descriptive information.

19. The computer program product of claim 18, wherein the initial information comprises a file descriptor and/or a size and wherein the descriptive information comprises a checksum, an owner, a creator, a creation date, a modification history, a transmission history, a transmission acknowledgement, and/or a processing notification.

20. The computer program product of claim 18, further comprising:
    computer readable program code configured to invoke an alert and/or an alarm at the destination if transmissions from the source and/or additional sources per a first unit of time exceed a first threshold, if a number of times that the attachment is received per a second unit of time exceeds a second threshold, and/or if a number of times that the attachment is received per a third unit of time exceeds a third threshold and the file is more current than the attachment.

* * * * *